(12) United States Patent
Guzmán Lucero et al.

(10) Patent No.: US 8,597,517 B2
(45) Date of Patent: Dec. 3, 2013

(54) PROCESS OF RECOVERY OF EXHAUSTED IONIC LIQUIDS USED IN THE EXTRACTIVE DESULFURIZATION OF NAPHTHAS

(75) Inventors: Diego Javier Guzmán Lucero, Mexico City (MX); Natalya Victorovna Likhanova, Mexico City (MX); Rafael Martínez Palou, Mexico City (MX); Eugenio Alejandro Flores Oropeza, Mexico City (MX); Jorge Froylán Palomeque Santiago, Mexico City (MX)

(73) Assignee: Instituto Mexicano del Petroleo, Mexico City (MX)

( * ) Notice: Subject to any disclaimer, the term of this patent is extended or adjusted under 35 U.S.C. 154(b) by 229 days.

(21) Appl. No.: 13/040,398

(22) Filed: Mar. 4, 2011

(65) Prior Publication Data

US 2011/0215052 A1    Sep. 8, 2011

(30) Foreign Application Priority Data

Mar. 5, 2010  (MX) .................... MX/a/2010/002574

(51) Int. Cl.
*B01D 11/00* (2006.01)
*B01D 21/01* (2006.01)

(52) U.S. Cl.
USPC ........ 210/639; 208/208 R; 208/236; 208/290; 210/724; 210/749; 210/770; 210/774; 210/806

(58) Field of Classification Search
USPC ......... 210/702, 719, 724, 725, 709, 749, 770, 210/806, 808, 638, 639, 634, 774; 208/208 R, 236–238, 244, 246, 254 R, 208/290, 291, 295, 296, 298; 585/833, 836, 585/838, 862, 864, 866, 868
See application file for complete search history.

(56) References Cited

U.S. PATENT DOCUMENTS

| | | | |
|---|---|---|---|
| 5,730,860 A | 3/1998 | Irvine | |
| 5,910,440 A | 6/1999 | Grossman et al. | |
| 6,160,193 A | 12/2000 | Gore | |
| 6,274,031 B1 | 8/2001 | Khare et al. | |
| 6,827,844 B2 | 12/2004 | Gunnerman | |
| 6,852,229 B2 * | 2/2005 | Mehnert et al. | 210/634 |
| 7,001,504 B2 * | 2/2006 | Schoonover | 208/236 |
| 7,198,712 B2 * | 4/2007 | Olivier-Bourbigou et al. | 208/238 |
| 7,553,406 B2 * | 6/2009 | Wasserscheid et al. | 208/236 |
| 7,691,771 B2 * | 4/2010 | Harris et al. | 502/150 |
| 7,825,259 B2 * | 11/2010 | Cassol et al. | 548/335.1 |
| 2003/0085156 A1 * | 5/2003 | Schoonover | 208/230 |
| 2004/0188350 A1 | 9/2004 | Beste et al. | |
| 2005/0010076 A1 * | 1/2005 | Wasserscheid et al. | 585/862 |
| 2007/0249486 A1 | 10/2007 | Elomari et al. | |
| 2009/0210841 A1 * | 8/2009 | Prakash et al. | 716/6 |
| 2011/0155638 A1 * | 6/2011 | Bhattacharyya et al. | 208/88 |

FOREIGN PATENT DOCUMENTS

| | | |
|---|---|---|
| CA | 2426770 | 5/2002 |
| CA | 2465374 | 5/2003 |

OTHER PUBLICATIONS

Speight J. G. Kirk-Othmer in Encyclopedia of Chemical Technology. A. Seidel (Ed), vol. 18, John Wiley & Sons, Inc., Hoboken, New Jersey, 2007.
Sampanthar J. et al., A novel oxidative desulfurization process to remove refractory sulfur compounds from diesel fuel, Applied Catalysis B: Environmental 63 (2006) 85-93.
MacAud M. et al., Novel methodology toward deep desulfurization of diesel feed based on the selective elimination of nitrogen compounds, Ind. Eng. Chem. Res. 2004, 43, 7843-7849.
Sevignon M. et al., Ultra-deep desulfurization of transportation fuels via charge-transfer complexes under ambient conditions, Green Chem., 2005, 7, 413-420.
Li F. et al., Microbial desulfurization of gasoline in a mycobacterium goodii X7B immobilized-cell system, Applied and Environmental Microbiology, Jan. 2005, p. 276-281.
Bosmann A. et al., Deep desulfurization of diesel fuel by extraction with ionic liquids, Chem. Commun., 2001, 2494-2495.
Eber J. et al., Deep desulfurization of oil refinery streams by extraction with ionic liquids, GreenChem., 2004, 6, 316-322.
Zhang S. et al., Extractive desulfurization and denitrogenation of fuels using ionic liquids, Ind. Eng. Chem. Res. 2004, 43, 614-622.
Nie Y. et al., Extractive desulfurization of gasoline using imidazolium-based phosphoric ionic liquids, Energy Fuels, 2006, 20(5), 2083-2087.
Holbrey J. et al., Desulfurisation of oils using ionic liquids: selection of cationic and anionic components to enhance extraction efficiency, Green Chem., 2008, 10, 87-92.
Schmidt, [bmim]AlCl4 Ionic liquid for deep desulfurization of real fuels, Energy Fuels, 2008, 22 (3), 1774-1778.
Ko N. et al., Extractive desulfurization using Fe-containing ionic liquids, Energy & Fuels 2008, 22, 1687-1690.
Jiang X. et al., Imidazolium-based alkylphosphate ionic liquids—A potential solvent for extractive desulfurization of fuel, Fuel 87 (2008) 79-84.
Liu D. et al., Deep desulfurization of diesel fuel by extraction with task-specific ionic liquids, Petroleum Science and Technology, 26:9,973-982.

* cited by examiner

*Primary Examiner* — Joseph Drodge
(74) *Attorney, Agent, or Firm* — Roylance, Abrams, Berdo & Goodman, L.L.P.

(57) ABSTRACT

A process for recovering ionic liquids comprising the steps of: providing a first ionic liquid mixture, the first ionic liquid having a halogen metallate anion, the mixture containing an organic solvent; adjusting the pH of the mixture to pH 7-10 by the addition of a base to form a first precipitate; separating the first precipitate from the mixture; removing the organic solvent from the first mixture to form a second precipitate and separating the second precipitate from the first mixture; acidifying the resulting mixture to pH 2-7 by the addition of an acid; and drying the mixture to obtain a second ionic liquid having a halogen anion.

17 Claims, No Drawings

PROCESS OF RECOVERY OF EXHAUSTED IONIC LIQUIDS USED IN THE EXTRACTIVE DESULFURIZATION OF NAPHTHAS

CROSS-REFERENCE TO RELATED APPLICATION

This application claims the benefit under 35 U.S.C. §119 of Mexican Patent Application No. MX/a/2010/002574, filed Mar. 5, 2010, which is hereby incorporated by reference in its entirety.

FIELD OF THE INVENTION

The present invention is related to the development and implementation of a process for the recovery of exhausted ionic liquids used in the extractive desulfurization of naphtha and can be applied to the recovery of ionic liquids that are sensitive to decomposition by reaction with nucleophiles such as water, alcohols and sulfur and nitrogen compounds.

Specifically, the objective of the invention is related to the implementation of a process for the recovery of different families of exhausted ionic liquids with general formula $C^+A^-$, where $C^+$ represents an organic cation, specifically but not exclusively, of a kind: alkyl pyridinium, di-alkyl imidazolium, trialkyl imidazolium, while the anion $A^-$ is represented by $[FeCl_4]^-$, $[FeBrCl_3]^-$, $Br^-$, $[AlCl_4]^-$, $[AlBrCl_3]^-$, $Cr^-$.

BACKGROUND OF THE INVENTION

The new regulations to reduce sulfur content in fossil fuels such as gasoline and diesel bring the search for new alternatives that are substantially different from the catalytic hydrogenation process, which is fully established in refineries [Speight J. G. Kirk-Othmer in Encyclopedia of Chemical Technology. A. Seidel (Ed), Volume 18, John Wiley & Sons, Inc., Hoboken, N.J., 2007, pp. 1-49]. This process operates at relatively high pressures and requires significant amounts of hydrogen, which are required high capital investment and operating costs. This is another reason for the search for new technologies that do not use the conventional hydrotreating.

Among the alternative processes that are not based on hydrotreating, is the adsorption of sulfur compounds on solid adsorbents [U.S. Pat. No. 6,274,031 issued to Phillips Petroleum and U.S. Pat. No. 5,730,860, this process is known as Pritchard] and the removal of sulfur compounds in a liquid phase immiscible with naphtha. There are alternative processes such as oxidative extraction [Sampanthar J. et al. Appl. Catal. B. 2005, 63, 85], complexation [Macauda M. et al. Ind. Eng Chem Res 2004, 43, 7843; Sevignon M. et al. Green Chem 2005, 7, 413]; biodesulfuratión [Li F. et al. Appl. Environ. Microbiol. 2005, 63, 85]; and ultrasonic treatment [U.S. Pat. No. 6,827,844]; all of them have not been developed sufficiently to be tested on an industrial scale.

Desulfurization technology based on liquid-liquid extraction of sulfur compounds or extractive desulfurization, EDS for its acronym in English, in the first instance, is attractive from an economic point of view, lower capital investment and low operating costs, usually at or near ambient temperature and ambient pressure. However, finding the appropriate solvent for extraction is one of the problems to overcome, mainly due to the partial miscibility of organic solvents with hydrocarbons [U.S. Pat. No. 7,001,504]. Among the most widely studied organic solvents are the polyalkylene glycols and polyalkylene glycol ethers, but its performance has not been satisfactory. Another method is to increase the polarity of organic sulfur compounds through partial oxidation and subsequent extraction with a polar solvent [U.S. Pat. Nos. 5,910, 440]. 6,160,193 discloses a process of oxidation of sulfur species into sulfoxides or sulfones by microorganisms in an aqueous medium. Another method uses an oxidizing agent such as peroxyacetic acid followed by extraction with an immiscible solvent such as dimethyl sulfoxide [U.S. Pat. No. 6,160,193].

Extractive desulfurization is considered of practical interest considering that the characteristics of the extraction processes are well established technologies and can be operated at ambient conditions. According to the above, one of the main features of the EDS is to find a good extracting of sulfur compounds and also has the following characteristics:

Easy to be regenerated for being used on different cycles,
Stability to be used repeatedly,
Immiscible with naphtha,
Do not contaminate the fuel,
Non-toxic, and
Friendly with environment To this end different ionic liquids were studied to find extractants for EDS [Bosmann A. et al. Chem Commun. 2001, 2494; Eber J. et al. Green Chem 2004, 6, 316, Zhang S. Ind. Eng Chem Res 2004, 43, 614; Niel Y. Energy Fuels. 2006, 20, 2083, J. Holbrey Green Chem 2008, 10, 87, R. Schmidt Energy Fuels. 2008, 22, 1774; Hee N. et al. Energy Fuels. 2008, 22, 1687, Xiang X. et al. Fuel 2008, 87, 79, Liu D. et al. Pet. Sci. Tech 2008, 26, 973, U.S. Pat. No. 7,001,504, CA Patent 02426770, CA Patent 02465374] and the analysis of experimental results has been concluded that they are very efficient extracting of sulfur compounds and also meet most of the above requirements.

Ionic liquids (IL) were developed in the early seventies and were focused mainly on battery development. Subsequently, they entered in different field in emerging scientific research due to their physicochemical characteristics, among others, having almost no vapor pressure, low toxicity and high temperatures of decomposition. For the above qualities, ionic liquids are considered as substances environmentally friendly or green solvents.

Deep desulfurization through liquid-liquid extraction using immiscible IL fuels is a potential application to be implemented in refineries, taking into account: the proven capacity of desulphurization technology, that extraction process is fully established, the immiscibility with naphtha and its ability to be recovered for reuse in multiple cycles of extraction.

The recovery of the IL that are used in extractive desulfurization is perhaps the most difficult to overcome for these substances have a brighter future in the implementation in refineries with a comprehensive process of desulfurization. In addition, the IL are expensive substances, on average, the cost of production of small quantities is about $1000 per kg, and in cases reached to produce large quantities can be obtained costs by U.S. $20-30 Kg [U.S. Patent Publication No. 2004/0188350 A1]. For the above reasons, although IL has deep desulfurization capacity, there is no clear industrial application without an attractive recovery process.

U.S. Pat. No. 7,001,504 B2 discloses several IL for desulfurization of hydrocarbons, IL including anions of the type Chloroaluminates ($AlCl4^-$), states that the ionic liquids are feasible to recover through different techniques among which include heating of IL for the evaporation of sulfur compounds, removal of sulfur compounds from the IL using another solvent, distillation under reduced pressure, oxidation of sulfur compounds present in the IL, supercritical extraction with $CO_2$ or combination of any of these techniques.

Another way in the recovery of IL is the use of biocatalysts, which oxidize the sulfur compounds and are removed from IL through extraction with a polar solvent. [U.S. Pat. No. 5,910,440].

Mexican patent application [Mx/a/2008/011121 N. V. Likhanova, R. Martinez Palou and J. F. Palomeque Santiago] describes another procedure for IL recovery by successive extractions of sulfur compounds with different solvents. This procedure is successful when ionic liquids have organic anions and cations.

In other research, the process of IL recovery with dimethyl phosphate and diethyl phosphate anions, which were used for desulfurization of model gasoline, by dissolving in water of these IL and subsequent precipitation or crystallization. The precipitates and crystals of sulfur-free IL are separated by centrifugation. The sulfur compounds are tracked in water by high performance liquid chromatography, HPLC.

U.S. Patent Publication No. 2007/0249486 A1 discloses the regeneration of IL used as catalysts. Here, the catalytic activity of 1-buthylpyridinium heptachloroaluminate ionic liquid was regenerated using gold and hydrogen.

Other studies of deep desulfurization of naphtha by using highly effective IL removal of sulfur compounds, especially using IL-containing halogenoferrates or halogen aluminates as anions, do not present methods for recovery of ionic liquids.

The ILs with halogenoaluminates and halogenoferrates have efficiencies above 90% in the desulfurization of naphthas, or whatever it is, deep desulfurization of naphthas. The same IL can fulfill another important feature to be used as extractants in the desulfurization, which has very low miscibility with naphtha. Therefore it is necessary recovery and reuse of IL in several cycles of desulfurization.

Given all this, it is necessary to develop a recovery process for IL which are efficient in the extractive desulfurization of naphthas and implement as an alternative technology for desulfurization of fuels.

The process claimed in this invention represents an alternative for the recovery of exhausted ILs containing which are used in deep extractive desulfurization of naphthas and have desulfurization efficiencies up to 95%. Although the scope of this invention is not limited to such application and that this recovery process can be applied to halogenometallates the recovery of IL sensitive to the presence of water or other nucleophiles that undergo a process of decomposition.

SUMMARY OF THE INVENTION

The present invention provides a process for recovering an ionic liquid used in the desulfurization of naphtha. The anion of the ionic liquid is a chloroferrate [$FeCl_4$], chlorobromoferrate [$FeBrCl_3$]$^-$, aluminum chlorate [$AlCl_4$]$^-$ or aluminum bromochlorate [$AlBrCl_3$]$^-$. The ionic liquid is recovered from the mixture of the ionic liquid and naphtha with an organic solvent such as acetone. The weight ratio of the spent ionic liquid to the organic solvent is 1:1 to 1:10, and preferably 1:2 to 1:5. The pH of the resulting ionic liquid/organic solvent mixture is adjusted to pH 7-10, and preferably pH 8-9 by the addition of an aqueous solution of a base, such as sodium hydroxide. The addition of an aqueous solution of sodium hydroxide forms a precipitate which is then removed from the ionic liquid/organic solvent mixture such as by filtration. The organic solvent is removed from the mixture, such as by evaporating under reduced pressure. The removal of the organic solvent can produce a precipitate in the remaining ionic liquid which is separated by filtration. The ionic liquid is mixed with an amount of an organic solvent such as acetone before or after the precipitate is removed. The resulting ionic liquid/organic solvent mixture is acidified to pH 2-7, and preferably pH 5-6 by the addition of an acid, such as hydrochloric acid. The organic solvent is then removed to obtain an ionic liquid having a chloride or bromide anion.

Other aspects of the invention are obtained by providing a process for recovering ionic liquids which are formed by organic cations and inorganic anions of halogenometallates, used for the desulfurization of naphtha including the following steps:

a) Desulfurization of naphtha using fresh ionic liquid (IL), b) Recovery of Ionic Liquid exhausted by the process of dissolution in acetone with a weight/weight ratio of IL/acetone from 1:1 to 1:10, and preferably from 1:2 to 1:5, c) Adjustment of the pH of the dissolution according to b), using an aqueous dissolution of sodium hydroxide to 7-10, and preferably to 8-9, where the addition of the solution of sodium hydroxide into the ionic liquids with chloroferrates and chlorobromoferrates anions forms a precipitate, d) Elimination of the precipitate according to c), by filtration, e) Removal of solvents at reduced pressure, f) Recovery of IL from the residue of salts by dissolution in acetone, g) Separation of salts by filtration at reduced pressure with filters of 0.45 microns, h) Acidification of the dissolution of acetone-IL by hydrochloric acid to a pH 2-7, and preferably to 5-6, i) Removal of acetone at reduced pressure, j) Drying of Ionic Liquid from 1-5 hours, and preferably from 1-3 hours at temperatures of 70-80° C., and vacuum of $10^{-3}$ to $10^{-4}$ mm Hg, and k) Confirmation of the structure of the IL recovered by Magnetic Nuclear Resonance.

The various features of the invention are also obtained by providing a process for recovering ionic liquids comprising the steps of providing a first ionic liquid mixture, the first ionic liquid having a halogen metallate anion, the mixture containing an organic solvent. The pH of the mixture is adjusted to pH 7-10 by the addition of a base to form a first precipitate. The first precipitate is separated from the mixture. The organic solvent is removed from the first mixture to form a second precipitate and the second precipitate is separated from the first mixture. The resulting mixture is acidified to pH 2-7 by the addition of an acid. The mixture is dried to obtain a second ionic liquid having a halogen anion.

These and other features of the invention will become apparent from the following detailed description of the invention which discloses various embodiments of the invention.

DETAILED DESCRIPTION OF THE INVENTION

The invention is directed to a process for the recovery of depleted IL used in a process of liquid-liquid extraction or extractive desulfurization of naphtha and its subsequent reuse in different cycles of desulfurization.

The IL which are in liquid phase at room temperature have the general formula $C^+ A^-$, where $C^+$ represents a organic cation, specifically, but not exclusively, of a kind: alkyl pyridinium, di-alkyl imidazolium, trialkyl imidazolium, while the anion A⁻ is represented mainly but not exclusively by [FeCl₄]⁻, [FeBrCl₃]⁻, Br⁻, [AlCl₄]⁻, [AlBrCl₃]⁻, Cl⁻ (Table 1).

TABLE 1

General structure of ionic liquids in liquid phase at room temperature.

C⁺ (Cations)

Imidazolium (with $R_1$, $R_2$, $R$ substituents on N atoms)    Pyridinium (with $R$ substituent on N)

A⁻ (Anions)

[FeCl₄]⁻, [FeBrCl₃]⁻, Br–, [AlCl₄]⁻, [AlBrCl₃]⁻, Cl⁻.

Where:
R, $R_1$, $R_2$ and $R_3$ are independent radicals represented by alkyl, cycloalkyl, benzyl, alkenyl or alky functionalized chains The method of recovery and use in several extraction cycles of the IL containing halogenometallates as anion consists of following steps:

1—The fresh IL synthesized and purified by conventional methods described in the literature, which contains in its structure the chloride or bromide anion was reacted with aluminum chloride or iron chloride in a stoichiometric ratio 1:1 to 1:5 IL/Chloride, preferably 1:1.2 to 1:3, in inert atmosphere for 10 to 30 minutes to obtain the corresponding ionic liquid with anions [AlCl₄]⁻, [AlBrCl₃]⁻, [FeCl₄]⁻, [FeBrCl₃]⁻. The ILs with chloroferrates have a dark red color and ILs with chloroaluminates are transparent and tend to have a light yellow.

2—In a covered container is introduced the ionic liquid with the metallic anions and the naphtha with a weigh/weight ratio of IL:naphtha from 1:10 to 1:100, preferably from 1:20 to 1:60.

3—The immiscible blend of naphtha and ionic liquid are shaken vigorously for 5 to 30 minutes, preferably 10-20 min.

4—The mixture of naphtha and ionic liquid is left to stand for 5-120 minutes, preferably 10-60 minutes, to achieve better separation of phases.

5—After elapsed time of phase separation, a sample of naphtha for the corresponding analysis of total sulfur content is taken.

6—The IL exhausted, used in the extractive desulfurization or liquid-liquid extraction, is recovered in acetone with a weight/weight ratio of IL/acetone of 1:1 to 1:10, preferably 1:2 to 1:5.

7—To the solution of IL exhausted and acetone is added an aqueous solution of sodium hydroxide to a pH of 7-10, preferably 8-9. pH values on this step of recovery are related to recovery efficiency of the precursor ionic liquid, that is to say, the ionic liquid that has chloride or bromide as an anion.

8—In the case of chloroferrates or chlorobromoferrates ILs anions, proceed as explained below:

8.1—Upon reaching the pH indicated in paragraph 7 a dark brown precipitate appears, which is separated by filtration.

8.2—The precipitate-free solution is concentrated and evaporated under reduced pressure to remove water and acetone.

8.3—Once the solvents are removed, a yellow liquid is obtained containing a white precipitate.

8.4—To the mixture cited in point 8.3 is added acetone, which dissolves the IL and keeps salts in as precipitates.

8.5—The precipitate is separated from the acetone dissolution with the IL through filtration with a 0.45 micron filter. The presence of soda in the IL affects it adversely in subsequent cycles of desulfurization.

8.6—The dissolution of IL-acetone is acidified with hydrochloric acid until a pH of 2-7, or preferably from 5-6 is reached.

8.7—Acetone is removed at a lower pressure.

8.8—Recovered Ionic Liquid is dried in an oven for 1-5 hours, preferably 1-3 hours at 70-80° C. and vacuum of $10^{-3}$ to $10^{-4}$ mm Hg.

8.9—The chemical structure of IL precursor with chloride or bromide anion is corroborated by Nuclear Magnetic Resonance of $^1H$ and $^{13}C$.

9—In the case of the IL with chloride aluminates and chloride bromide aluminates the following procedures are applied.

9.1—Reach the pH indicated in point 7.

9.2—After reaching the pH no precipitate is obtained.

9.3—Solvents are removed at lower pressure.

9.4—When water and acetone are removed from mixture a yellow liquid with a white precipitate appears, which may be due to soda in excess and some salts derived from the IL recovery process.

9.5—To the mixture cited in point 9.4 is added acetone, which dissolves the IL and maintains salts as precipitates.

9.6—The IL-acetone solution is acidified with hydrochloric acid until a pH of 2-7, or preferably from 5-6 is obtained.

9.7—The precipitate is separated from the solution of IL in acetone through filtration by a filter of 0.45 microns.

9.8—Acetone is eliminated at a lower pressure.

9.9—Recovered IL is dried in an oven for 1-5 hours, preferably 1-3 hours at 70-80° C. and vacuum in the range of $10^{-3}$ to $10^{-4}$ mm Hg.

9.10—Chemistry structure of the Ionic Liquid precursor with chloride or bromide anion was confirmed by Nuclear Magnetic Resonance of $^1H$ and $^{13}C$.

These procedures are repeated every time you may need to recover the former IL. This way another cycle of desulfurization and recovery of the exhausted ILs are initiated, as it is described from point 1.

EXAMPLES

Two examples pertaining to the recovery of exhausted ILs used in the extractive desulfurization of naphtha are described. These cycles of reuse include the results obtained from desulfurization; firstly with fresh IL, and secondly with the IL recovered following the claimed process in the present invention.

Example 1

1—First Cycle: Extractive Desulfurization with Fresh IL N-Methyl-N-Hexylimidazolium [HDMIM] Tetrachloroferrate FeCl₄

In a glass reactor of 350 mL equipped with a magnetic stirring mechanism, 5.0 g of transparent light yellow IL of chloride of N-methyl-N-hexylimidazolium [HDMIM] Cl is introduced along with 6.0 g of anhydrous iron chloride for chemical reaction. The mixture is stirred for 10-20 minutes at room temperature to obtain a dark red liquid corresponding to IL N-methyl-N-hexylimidazolium [HDMIM] FeCl₄ tetrachloroferrate. Obtained IL is mixed with 220 g of naphtha from the "Morelos" Gas Processor Centre of PEMEX. This naphtha originally contained a total sulfur concentration of 237 ppm. The two phase mixture is shaken vigorously for 10-20 minutes and it is left in rest for 10-60 minutes to improve the separation of the two liquid phases. A sample of 2 mL is taken from the top layer to be sent for total sulfur determination, which is carried out according to standard ASTM D 5453-05: Standard Test Method for Determination of Total Sulfur in Light Hydrocarbons, Motor Fuels and Oils by Ultraviolet Fluorescence using team Antex 9000S.

The total sulfur of the naphtha treated with fresh IL [HDMIM] $FeCl_4$ was 9.48 ppm, which corresponds to 96% removal of total sulfur from the original sample.

After removing all the naphtha from the reactor a very viscous dark brown substance remained. This substance is the exhausted IL [HDMIM] $FeCl_4$ after the desulfurization process.

1.1—Recovery of Exhausted Ionic Liquid

Exhausted IL is recovered by means of its dissolution with 20 mL of acetone. An aqueous solution of soda is added to previous dissolution to reach a pH of 8-9. After reaching the solution pH, a precipitate of dark brown color is obtained, which is separated from the solution by filtration. The final solution is colorless and transparent.

Water and acetone are removed at lower pressure until it appears a yellow liquid with a white precipitate. Ionic Liquid is recovered with 10-20 mL of acetone, which does not dissolve the precipitate. The precipitate is removed with a filter of 0.45 microns.

Ionic Liquid and acetone solution are acidified with hydrochloric acid until a pH of 5-6 is reached. Subsequently, acetone is eliminated at a lower pressure.

Recovered Ionic Liquid is dried in an oven for 1-3 hours at 75° C. and vacuum within $10^{-3}$ to $10^{-4}$ mmHg. A pale yellow transparent liquid is obtained. It was weighed and obtained 4.5 g of former IL or of chloride of N-methyl-N-hexylimidazolium to have a approximately a 90% recovery efficiency.

The chemical structure of Ionic Liquid precursor of chloride of N-methyl-N-hexylimidazolium was corroborated by Nuclear Magnetic Resonance of $^1H$ and $^{13}C$.

2—Second Cycle: Extractive Desulfurization with the Recovered IL

In a glass reactor of 350 mL equipped with a magnetic stirring mechanism, 4.5 g of transparent light yellow IL chloride of N-methyl-N-hexylimidazolium [HDMIM] Cl is introduced along with 5.4 g of iron chloride anhydrous for chemical reaction. The mixture is stirred for 10-20 minutes at room temperature to obtain a dark red liquid corresponding to IL N-methyl-N-hexylimidazolium [HDMIM] $FeCl_4$ tetrachloroferrate. Obtained IL is mixed with 198 g of naphtha from the "Morelos" Gas Processor Centre of PEMEX. This naphtha originally contained a total sulfur concentration of 237 ppm.

Following the steps cited in point 1 of Example 1 the sulfur content of naphtha treated with IL [HDMIM]$FeCl_4$, previously obtained from the IL recovery of its precursor [HDMIM]Cl, was 21.3 ppm which resulted in a 91% removal of total sulfur from the original sample.

2.1—Exhausted Ionic Liquid Recovery

Following the steps cited in point 1.1 of Example 1, 4.0 g of IL precursor, chloride of N-methyl-N-hexylimidazolium, were obtained. This corresponds to 88.8% of recovery efficiency.

The chemical structure of Ionic Liquids (ILs) precursors of N-methyl-N-hexylimidazlium chloride, was confirmed by $^1H$ and $^{13}C$ Nuclear Magnetic Resonance.

3—Third Cycle: Extractive Desulfurization Using the Recovered IL 4.0 g of the transparent and light yellow N-methyl-N-hexylimidazlium chloride [HDMIM]Cl and 4.8 g of iron (III) chloride were added to a glass reactor of 350 mL with vigorous magnetically stirring during 10-20 minutes. After this reaction time, a dark red liquids corresponding to a N-methyl-N-hexylimidazlium tetrachloroferrate IL [HDMIM]$FeCl_4$ which was mixed with 198 g of natural gasoline obtained from a gas processing centre, containing 237 ppm of total sulfur.

Following the same steps described in the point 1 in Example 1, a sulfur content obtained with the recuperated IL [HDMIM]$FeCl_4$ from the precursor [HDMIM]Cl, was of 26 ppm, corresponding to 89% of total sulfur removed respect to the original sample.

3.1—Recovery of the Exhausted Ionic Liquid

Following the same steps of point 1.1. from Example 1, 3.6 g of IL precursor was obtained, that is, N-methyl-N-hexylimidazlium chloride, corresponding to a recovery efficiency of 90%.

The chemical structure of Ionic Liquids (ILs) precursors of N-methyl-N-hexylimidazlium chloride, is confirmed by $^1H$ and $^{13}C$ Nuclear magnetic Resonance.

Example 2

1—First Cycle: Extractive Desulfuration with Fresh IL of N-methyl-N-hexylimidazolium Trichlorobromoaluminate, [HDMIM]$AlBrCl_3$ 1.5 g of transparent IL N-methyl-N-hexylimidazolium bromide and 1.2 g of aluminum chloride were added to a glass reactor with vigorous stirring during 10-20 minutes. After this reaction time, a dark red liquid corresponding to a N-methyl-N-hexylimidazolium trichlorobromoaluminate, [HDMIM]$AlBrCl_3$, which was mixed with 54 g of natural gasoline obtained from a gas processing centre, containing 237 ppm of total sulfur.

Following the same steps described in the point 1 in Example 1, a sulfur content obtained with the fresh IL [HDMIM]$AlBrCl_3$ was 4.7 ppm, corresponding to 98% of total sulfur removed with respect to the original sample.

1.1—Recovery of IL Exhausted

Exhausted IL was recovered by dilution with 5 mL of acetone, then, a soda solution was added until pH of 8-9. The transparent solution was a light yellow.

Water and acetone were removed by evaporation to obtain a light yellow powder. 5-10 Ml of acetone were added and the precipitate was removed by filtration in a filter of 4.5 microns.

The solution of IL and acetone is acidified with acid chloride until pH of 5-6 is reached and then the acetone was evaporated.

The recovered IL was dried on vacuo during 1-3 hours at 75° C. and $10^{-3}$ a $10^{-4}$ mm de Hg of vacuo. A transparent light yellow IL was obtained. 1.38 g of precursor IL, that is, N-methyl-N-hexylimidazolium bromide was obtained, corresponding to a recovery efficiency of 92%.

The chemical structure of Ionic Liquids (ILs) precursors of N-methyl-N-hexylimidazlium bromide, was confirmed by $^1H$ and $^{13}C$ Nuclear Magnetic Resonance.

2—Second Cycle: Extractive Desulfurization Using the Recovered IL 1.38 g of the transparent and light yellow N-methyl-N-hexylimidazlium bromide [HDMIM]Br and 1.1 g of aluminum (III) chloride were added to a glass recipe of 100 mL with vigorous magnetical stirring during 10-20 minutes. After this reaction time, a dark red liquids corresponding to a N-methyl-N-hexylimidazlium trichlorobromoaluminate IL [HDMIM]AlCl$_4$ which was mixed with 49.5 g of natural gasoline obtained from a gas processing centre, containing 237 ppm of total sulfur.

Following the same steps described in the point 1.1 in Example 2, a sulfur content obtained with the recuperated IL [HDMIM]AlBrCl$_3$ from the precursor [HDMIM]Cl, was of 11.8 ppm, corresponding to 95% of total sulfur removed respect to the original sample.

2.1—Recovery of IL Exhausted

Following the same steps described in the point 1.1 in Example 2, 1.25 g of precursor IL, this is N-methyl-N-hexylimidazolium bromide corresponding to a 91% of recovery efficiency.

The chemical structure of Ionic Liquids (ILs) precursors of N-methyl-N-hexylimidazlium bromide was confirmed by $^1$H and $^{13}$C Nuclear magnetic Resonance.

Example 3

1—First Cycle: Extractive Desulfuration with Fresh IL of N-butylpyridinium, Tetrachloroferrate [BuPy]FeCl$_4$ 1.5 g of transparent and light yellow N-butylpyridinium chloride and 2.1 g of iron (III) chloride were added to glass reactors of 100 mL with vigorous stirring during 10-20 minutes. After this reaction time, a dark red liquid corresponding to a N-butylpyridinium, [BuPy]FeCl$_4$, which was mixed with 72 g of natural gasoline obtained from a gas processing centre, containing 237 ppm of total sulfur.

Following the same steps described in the point 1 in Example 1, a sulfur content obtained with the fresh IL [HDMIM]AlBrCl$_3$ was 4.7 ppm, corresponding to 98% of total sulfur removed respect to the original sample.

1.1—Recovery of Depleted Ionic Liquid

Following the same steps of 1.1 in Example 1, 1.35 g of the IL precursor, N-butylpyridinium chloride, was obtained. This corresponds to a recovery of 90% efficiency.

The chemical structure of ionic liquid precursor N-butylpyridinium chloride was confirmed by Nuclear Magnetic Resonance of $^1$H and $^{13}$C.

What is claimed is:

1. A process for regeneration of ionic liquids having an organic cation and a halogenmetallate anion, after being used as an extracting agent for sulfur compounds, said process comprising:
   a) Dissolving said used ionic liquid in acetone in a ratio (w/w) of 1:1 to 1:10,
   b) Adjusting the pH of the solution obtained in a) by addition of an aqueous solution of sodium hydroxide to obtain a pH of 7-10, and and form a precipitate,
   c) Filtering the solution obtained in b) to remove the precipitate from the solution,
   d) Removing the solvent from the filtrate obtained in c) by evaporation under reduced pressure,
   e) dissolving the residue obtained in step d) in acetone at a ratio (w/w) of 1:10 to 1:50,
   f) Filtering the solution to remove the precipitate obtained in step e),
   g) Adjusting the pH of the solution obtain in f) by adding an aqueous solution of hydrochloric acid to a pH range of 2-7,
   h) Removing the solvent from by evaporation of the filtrate obtained in step f) under reduced pressure to obtain regenerated ionic liquid,
   i) heating the regenerated ionic liquid obtained in step h) to 70-80° C., under reduced pressure until dry.

2. The process of claim 1, wherein said cation is an alkylpyridinium, di-alkyl imidazolium, or trialkyl imidazolium, and said anion is a halogenmetallate anion [FeCl$_4$]$^-$, [FeBrCl$_3$]$^-$, [AlCl$_4$]$^-$, or [AlBrCl$_3$]$^-$.

3. The process of claim 1, wherein the ionic liquid has a halogenmetallate anion and a cation having the formula

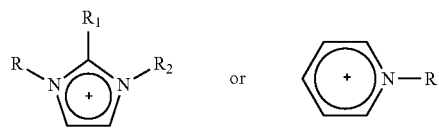

wherein R, R$_1$ and R$_2$ are alkyl, cycloalkyl, benzyl or alkenyl, said anion being [FeCl$_4$]$^-$, [FeBrCl$_3$]$^-$, [AlCl$_4$]$^-$, or [AlBrCl$_3$]$^-$.

4. The process of claim 1, wherein said used ionic liquid had been used for the desulfurization of naphtha.

5. The process of claim 1, wherein the structure of the regenerated ionic liquid is confirmed by Magnetic Nuclear Resonance.

6. A process for regeneration of ionic liquids that have been used in extractive desulfurization comprising the steps of:
   providing a first ionic liquid mixture comprising said used ionic liquid, said first ionic liquid having a halogen metallate anion, said mixture containing an organic solvent;
   adjusting the pH of the mixture to pH 7-10 by the addition of a base to form a first precipitate;
   separating the first precipitate from the mixture;
   removing the organic solvent from the first mixture to form a second precipitate and separating the second precipitate from the first mixture;
   acidifying the resulting mixture to pH 2-7 by the addition of an acid; and
   drying the mixture to obtain a second ionic liquid having a halogen anion.

7. The process of claim 6, wherein said halogenometallate of said first ionic liquid is selected from the group consisting of [FeBrCl$_3$]$^-$, [FeCl$_3$]$^-$, [AlCl$_4$]$^-$ and [AlBrCl$^3$]$^-$.

8. The process of claim 6, wherein said organic solvent is acetone and said spent ionic liquid resulted from the desulfurization of naphtha.

9. The process of claim 6, wherein said base is an aqueous solution of sodium hydroxide.

10. The process of claim 6, wherein said acid is hydrochloric acid.

11. The process of claim 6, wherein the second precipitate is removed by adding acetone to the first mixture and filtering the resulting mixture to separate the second precipitate.

12. The process of claim 11, further comprising heating the resulting mixture under reduced pressure to remove the acetone to obtain the second ionic liquid, and drying the second ionic liquid under reduced pressure.

13. The process of claim 6, wherein said first ionic liquid is obtained from a naphtha desulfurization process.

14. A process for regeneration of exhausted ionic liquids, wherein the ionic liquid has an organic cation having the formula

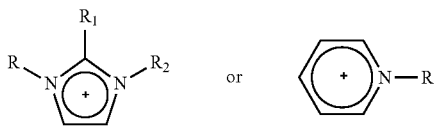

wherein R, $R_1$ and $R_2$ are alkyl, cycloalkyl, benzyl or alkenyl, and an anion selected from the group consisting of $[FeCl_4]^-$, $[FeBrCl_3]^-$, $[AlCl_4]^-$ and $[AlBrCl_3]^-$, said exhausted ionic liquid having been used as an extracting agent for sulfur compounds for desulfurization of naphtha, said process comprising, a) dissolving said exhausted ionic liquid in acetone in a ratio (w/w) of 1:1 to 1:10, b) adjusting the pH of the solution obtained in a) to a pH of 7-10 by addition of an aqueous solution sodium hydroxide, and to form a precipitate, c) filtering the solution obtained in b) to remove the precipitate from the solution, d) removing the solvent from the filtrate obtained in c) by evaporation under reduced pressure, e) dissolving the residue obtained in step d) in acetone at a ratio (w/w) of 1:10 to 1:50, f) filtering the solution to remove the precipitate obtained in step (e) under reduced pressure with a filter of 0.45 microns, g) adjusting the pH of the solution obtained in 0 to a pH range of 2-7 by adding an aqueous solution of hydrochloric acid, h) removing the solvent from by evaporation of the filtrate obtained in step f) under reduced pressure to obtain regenerated ionic liquid, i) heating the regenerated ionic liquid obtained in step h) to a temperature of 70-80° C. for 1-5 hours under a vacuum of $10^{-3}$ to $10^{-4}$ mm Hg until dry.

15. The process of claim 14, wherein the pH of the solution in step b) is adjusted to 5-6.

16. The process of claim 14, wherein the pH of the solution in step g) is adjusted to 8-9.

17. The process of claim 14, wherein the ionic liquid in step i) is heated for 1-3 hours.

* * * * *